3,686,062
METHOD FOR PRODUCING PAPER-LIKE LAMINATED MATERIAL REINFORCED WITH NON-WOVEN FABRIC, AND REINFORCED COMPOSITE LAMINATED PRODUCT THEREFROM OBTAINED
Bruno Romanin, 8 Via Vincenzo Monti, Milan, Italy
Filed May 14, 1970, Ser. No. 37,238
Claims priority, application Italy, May 20, 1969, 17,033/69
Int. Cl. B32b 5/12
U.S. Cl. 161—57     13 Claims

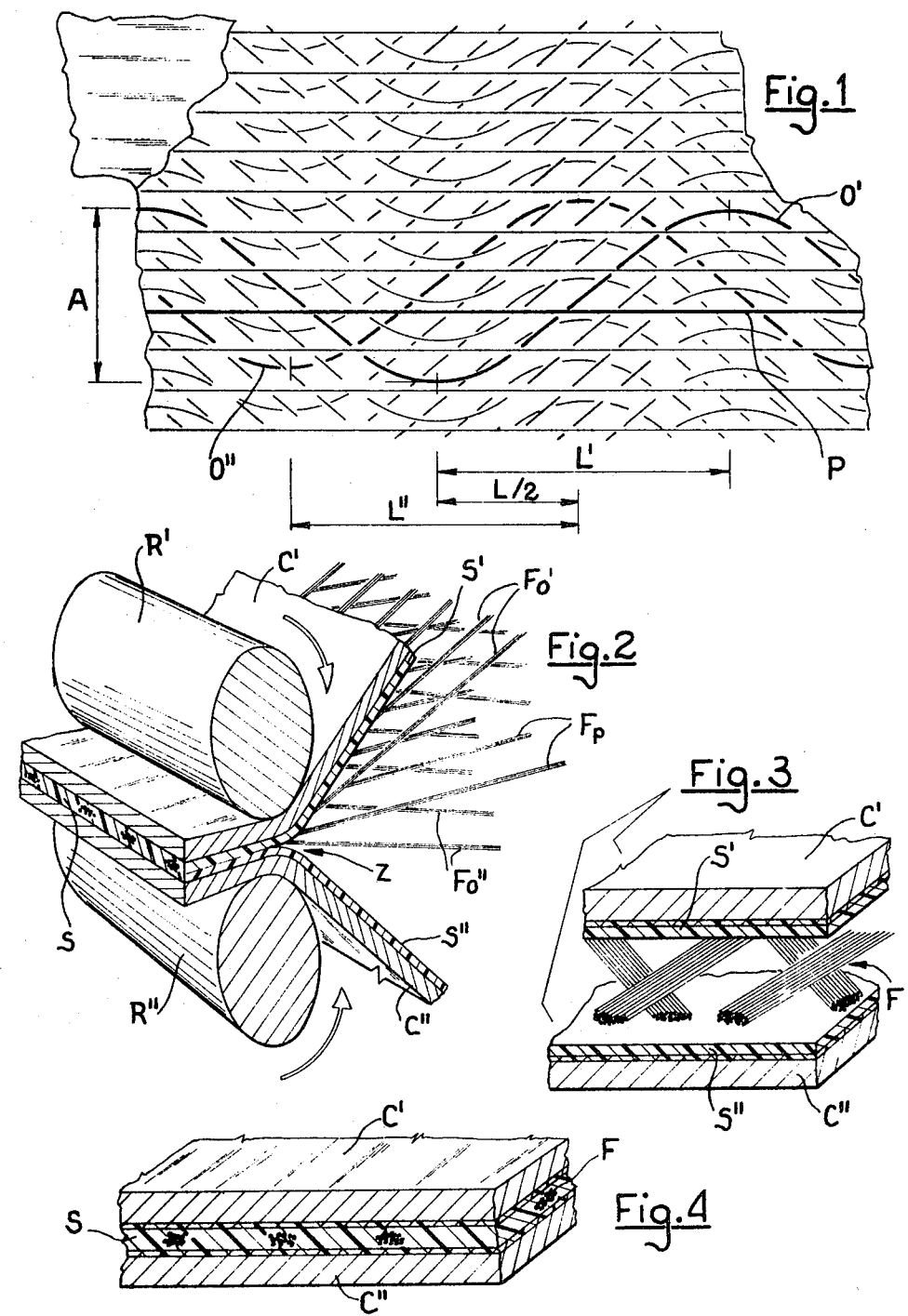

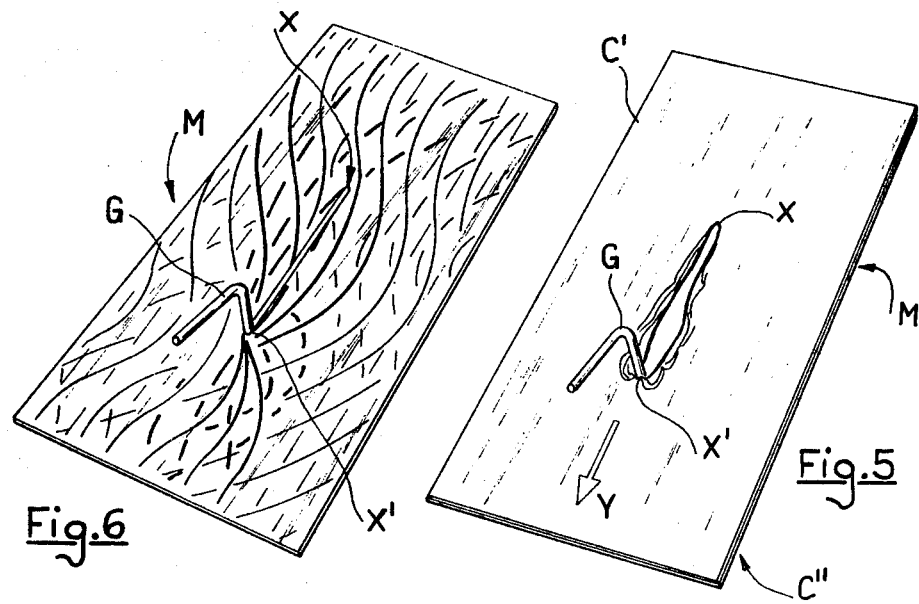
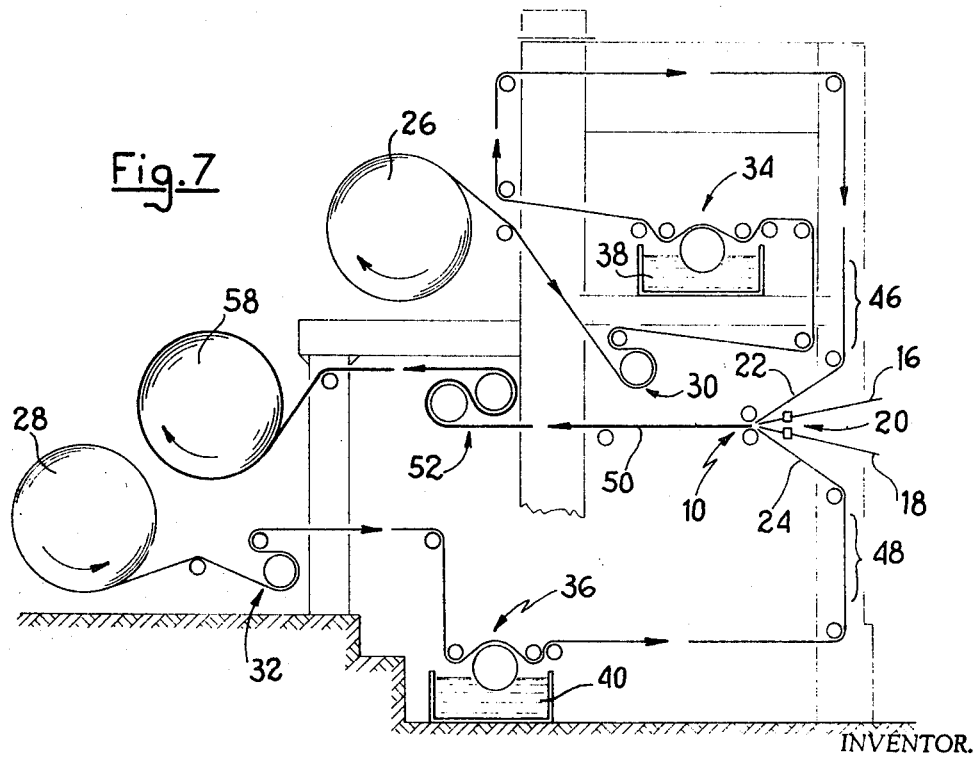

ABSTRACT OF THE DISCLOSURE

A method for producing a composite laminated material consisting of two or more paper sheets embodying therebetween a net-like textile structure, the method comprising the steps of providing a non-woven textile structure formed by straight parallel fitted yarns and by at least two sets of phase opposed sinusoidally arranged yarns, and of embodying the structure between the paper sheets by means of an adhesive intermediate layer.

BACKGROUND

This invention concerns a method of commercially producing laminated materials, particularly comprising two or more paper-like components, wherein a reinforcing textile structure of a so-called "non-woven fabric" type is embodied.

The reinforced composite laminated products obtained according to this invention find a particularly advantageous application in packing field, for wrapping bundles, in manufacturing sacks, bags and other equivalent containers, and in any other use wherein a cheap laminated material, having a high mechanical strength and in particular a very high tearing resistance is required.

The use of paper having a suitable quality and consistency, in one or more superposed layers, is typical and also preponderant in the field of packaging and manufacturing sacks and similar containers for granular and dry products in general, especially when relatively cheap products are required.

Paper sheets and in particular so called "kraft" paper sheets are considered the most suitable material for the abovestated or equivalent applications. The cheapness of such paper sheet materials is associated with excellent gas-proof and lightproof features, good pliability and even mechanical strength, in particular tensile strength. The only practical drawback of paper consists in its notoriously poor resistance to piercing and tearing, since from an initially localized breaking point a tearing may start which progresses when a breaking means (e.g. a metal nail, a sharp corner, a wood splinter or the like) is moved into the damaged paper.

In order to at least partly reduce the ill effects of the poor tearing strength of paper, textile reinforcement for paper sheet materials were used, as well known. In fact, composite paper materials, consisting of two paper sheets glued with each other and comprising a net-like fabric embodied therebetween are already well known. The thus obtained paper sheet increase in mechanical strength and tearing resistance are proportional to the closeness and strength of the textile reinforcement, which single yarns are designed to form as many obstacles or stopping means against the tearing or progressive laceration. The progressive laceration may be regarded as a sequence of small localized actions all along the tearing path and occurring in succession.

It has already been proposed to utilize non-woven fabrics as reinforcement means, in order to reduce the manufacturing costs. However, owing to a poor cohesion between the fibrous components of such non-woven fabrics, only a limited increase in the tearing resistance is attained, since such tearing action as defined above can often break or disjoin from one another of the reinforcement fibrous or filamentous components.

SUMMARY

An object of this invention is to provide paper laminated products, and more particularly a composite laminated product reinforced with a textile material, which is free from the above stated heavy limitations of said already known products.

More specifically, the composite laminated products according to the invention comprise paper sheets and a reinforcement therebetween which, owing to its features and association and embodying conditions with said paper sheets, gives an unusually high tearing resistance to the end product, such resistance being higher than that exerted by the same material to an initial localized breaking or perforation thereof. In other words, a progressively but quickly increasing tearing resistance is exerted by a composite, reinforced product according to this invention, since said progressive tearing interferes with an increasingly larger area of the composite product.

According to a feature of this invention, said reinforcement is in the form of a non-woven fabric, of the type comprising a plurality of yarns or filaments, orderly arranged in essentially sinusoidal patterns and in phase opposition, the single yarns or filaments being spaced apart to insure each yarn or filament crosses, with a substantial geometric uniformity, a plurality of different yarns or filaments. Said non-woven fabric preferably comprises also a plurality of straight yarns or filaments, in parallel relationship both with one another and to the axes of sinusoidally arranged yarns or filaments.

Such non-woven textile structures, embodied between opposite sheet materials and firmly secured therewith have been thoroughly disclosed in my U.S. Pat. No. 3,314,841.

Moreover, according to the invention, said textile structure is arranged between and fastened to adjacent paper sheets, by embodying same in an intermediate layer which thickness is about the same as that of said non-woven fabric. Said layer allows the yarns of said non-woven fabric—when a damage occurs—to be compelled to move in their lying plane only, i.e. within said intermediate layer, without any local tearing of adjacent paper sheets.

In fact, it has been surprisingly noticed that, under the above conditions, a progressive tearing action results in a likewise progressive shifting of yarns, which tend to converge and stretch themselves at the point wherein said tearing action is applied, in order to distribute their stresses into an increasingly larger surface area of said laminated structure.

According to an advantageous feature of this invention, said multi-acting intermediate layer is formed by thermosetting or thermoplastic adhesives, adapted to be applied at high temperatures and in the form of a viscous liquid to one, or preferably to both sides of the paper sheet materials between which the reinforcing textile structure is to be embodied. Adhesives of a suitably adapted "hot-bond" type are preferably utilized.

Moreover, synthetic yarns, particularly of linear polymers and preferably multi-filament yarns of polyamide, polyesters and like resins, having physical and elastic properties suitable for each product, are preferably utilized in the production of said non-woven fabric.

In particular, for connecting said paper sheet materials and forming said intermediate layer, thermoplastic compounds including an elastomer are used in order to attain the most favourable balance between the elastic properties of the textile reinforcement and the materials associated therewith.

DRAWINGS

FIG. 1 is a fragmentary plan view of a laminated material according to the invention, the upper sheet thereof being removed to show a part of interposed textile structure.

FIG. 2 is a perspective diagrammatic view showing how said laminated product is formed.

FIG. 3 is a similar view of the sheet and textile materials ready to be laminated together.

FIG. 4 is a view of the same components connected with one another in a laminated material according to the invention.

FIG. 5 is a perspective view of a laminated material according to the invention as subjected to a tearing action that tends to progressively advance.

FIG. 6 is a view corresponding to FIG. 5, wherefrom the top sheet component has been removed and wherein the behaviour of textile reinforcement components is exhibited in order to show the occurrence of a strength progressive increase and tearing standstill.

FIG. 7 is a diagrammatic side view of an equipment for a continuous commercial production of a product according to this invention.

PREFERRED EMBODIMENT

Referring to the drawings, FIG. 1 shows a typical embodiment of a non-woven textile structure utilized to produce a composite laminated product. Said structure consists of a plurality of yarns, arranged both in parallel spaced relationship with one another and sinusoidally. One of said parallel yarns is designed by the reference P, while O' and O" are two sinusoidally arranged yarns, having equal halfwave lengths L', L" respectively and equal wave height A. Such structure is obtained by applying a technology as disclosed in the above-stated my U.S. Pat. No. 3,314,841.

To attain a more favourable geometric uniformity of such net-like textile structure, the yarn groups to which a reciprocating crosswise motion is imparted in order to form said wave patterns O' and O" respectively, are reciprocated with a ¼ phase displacement in order to obtain wave patterns shifted by one-fourth of wave length, or by L/2 as indicated in FIG. 1 (one-half of half-wave length), in the longitudinal direction of said product during the manufacture thereof. The regular geometric distribution thus obtained is clearly shown in FIG. 1.

The number, features and spacing of single yarns shall obviously depend on the mechanical resistance which is to be attained. When a very cheap material is to be produced, it may be sufficient that the wave height A be at least four times the interval between two adjacent parallel yarns. Moreover, the production speed can be increased by decreasing said height A down to a rather small value, e.g. not exceeding 50 mm., as well as by increasing the wave length, e.g. in such a manner as A be equal to one-third or less of wave length 2L.

The laminated material manufacture may be carried out, from a merely mechanical viewpoint, as disclosed in said previously referred patent. As diagrammatically shown in FIG. 2, the yarns $F_p$, adapted to form said parallel yarn pattern P, are fed to an operating zone Z by a pair of oppositely driven rollers R' and R", along with yarns Fo' and Fo" to which a sidewise reciprocating motion is imparted in order to form said wave patterns. The resulting textile structure is embodied between at least two paper sheets C' and C", which inner sides are coated by layers S' and S", respectively, of a thermo-adhesive thermoplastic resin, preferably as hereinafter stated, and designed to form together an intermediate layer S wherein the different yarns F are wholly embodied.

Said layers S' and S" partly penetrate in said paper sheets to ensure a firm bond therewith, without however any substantial change in their physical and mechanical properties. Moreover, the thickness of said layers may be such as to form a required intermediate layer comprising the volume taken-up by the yarns (which however practically amounts to a very small fraction of said intermediate layer total volume).

In addition, as shown by way of example in FIG. 3, the single yarns are preferably of a multifilament type, in order to obtain, in addition to purely textile features of said yarns, a better bond with the intermediate layer and a reduction in the thickness of net-like non-woven fabric, since said multi-filament yarns undergo a substantial flattening and an approximately planar distribution of their filaments.

The main effects of the above described composite structure, when a progressively advancing tearing action is exerted (i.e. the action which represents the main damaging and unserviceability reasons in wrapping and packings of paper-like material) are shown by way of example in FIGS. 5 and 6.

Assuming that a composite laminated material M produced as above described is pierced e.g. in starting point X by means of a sharp pointed body, e.g. by a hook G, that tends to move in direction Y after said piercing action, the single yarns or filaments of textile reinforcement that are successively encountered by the hook during said motion in direction Y are not broken but are caused to shift in their lying plane or within the intermediate layer, thereby causing a small, local delamination of adjacent paper sheets C' and C", and converging in a still more number into the points successively attained by the tearing body G. Thus, assuming that the point X' is attained by said body, a large number of yarns will be stretched, thereby distributing their stresses on a greater width and consequently also on a wide section and surface area of the material. Therefore an increasing tearing resistance is exerted by said material which is not torn further-on beyond said tear between X and X'.

Practical texts proved that, apart from unusually strong tearing actions, a tearing can advance only across a few centimeters, beyond which the tearing resistance becomes practically insuperable. A wrapping or packing which undergoes such a small damage or tearing will practically maintain its holding and protecting ability and property.

In addition to a preferred manufacturing practice, comprising a coupling operation of two paper sheets, a film of plastics or any other suitable material may be also substituted for one of the paper sheets, to obtain e.g. a more efficiently gas and liquid proof product, a higher chemical resistance and so on. Similar results may be attained by previous and/or successive impregnations of one or both paper sheets with a suitably proofing material or by coatings laminated or spread thereon, or finally by a metallization of said paper.

In a particularly suitable embodiment of this invention, the outer side of reinforced laminated material is coated with an adhesive layer for obtaining high-strength pressure sensitive tape and/or paper.

Moreover, when a material having a very high consistency and strength (even to piercing) is produced, said laminated product may be formed with three or more sheets, at least partly of paper, and reinforced with two or more textile structures interposed between the adjacent components as described above. Conversely, when lighter or absorbent paper sheets and even cellulose wadding sheets are used, clothing wares and hygienic articles can be produced, as e.g. disposable handkerchiefs and napkins, towels, swaddling clothes, dusters, wipers and the like.

The bonding and composition of intermediate layer or layers shall be adapted to the pliability, plasticity and elasticity requirements in the final product. When very soft and permeable products are required, a discontinuous bonding operation, i.e. a spot bonding or a bonding along crossed lines or the like, with variable ratios of bonded surface to the total surface may be advantageously carried-out.

It is usually more convenient to make a gapless bond, which also promotes a liquid and gas proofing action, since the intermediate layer or layers represent an efficient shield against fluids.

As said intermediate layer or layers should not result in a stiffening means of the laminated material (except when otherwise required), the composition of said layer must obviously meet, in addition to usual requirements of an easy application, prompt adhesion and quick bonding, for a cheap continuous production, also the pliability and elastic or plastic deformability requirements, corresponding to those of paper or other bonded sheet material.

To such a purpose, according to a further feature of this invention, the composition of said intermediate layer comprises thermoplastic adhesives, consisting at least of a high molecular weight resin and at least of one wax, and if required of one or more low molecular weight resins. Said composition may comprise also suitable additives, as e.g. antioxidizing agents, fillers and in general all other ingredients adapted to impart suitable properties to said intermediate layer or laminated end product, according to single applications thereof.

The elastic deformability of said intermediate layer can be obtained in particular with a natural or synthetic elastomer—as e.g. butyl rubber—added to adhesive bonding compound forming said intermediate layer, in an amount as required to obtain a good balance between the elastic properties of textile reinforcement and the deformabiltiy of sheet materials bonded thereto.

The high molecular weight resins are prevailingly designed to ensure a high thermo-adhesive power. They can be selected from the group consisting of ethyl-celluloses, butyl-methacrylates, polyethylene, polystyrene and styrene copolymers, polyisobutylene, polyamides, polyvinyl-acetate and its derivatives. Particularly advantageous are ethylenevinyl acetate copolymers, containing from 25% to 34% and preferably from 27% to 29% of vinyl acetate.

The waxes decrease the mixture softening point and restrain the absorption thereof into the paper material. Natural or synthetic waxes, comprising not functional groups, can be utilized. Paraffin waxes are preferably utilized. The ration of waxes to resins may be in the range of 20 to 60 parts by weight, and preferably of 40 to 60 parts by weight of wax to 100 parts by weight of resin.

The low molecular weight resins improve given adhesivity and life properties of the intermediate layer. They can be selected e.g. from the group consisting of coumarone-indene resins, alkyl resins, terpene resins, phenol-formaldehyde resins of the thermostable type, colophony and their derivatives. Such resins may be present in the mixture in a ratio smaller than 100 parts, and preferably smaller than 80 parts by weight to 100 parts by weight of high molecular weight resins.

The antioxidant agents, as e.g. compounds of butylated hydroxytoluene groups, improve the resistance of intermediate layer to ageing. They are added to the mixture in amounts of 0.1% and preferably of 0.2% by weight.

The elastomer, as e.g. butyl rubber, when added in amounts of 2–3% by weight on the basis of wax weight, imparts a required elastic deformability to intermediate layer, even at low temperatures, and additionally improves its thermo-adhesive properties.

Different fillers, as e.g. calcium carbonate, aluminium silicates and the like, may be added for reducing the resulting mixture costs, in amounts in the range of 2–10% by weight, on the basis of higher resin weight.

The bonding adhesive forming said intermediate layer is preferably obtained by mechanically mixing and homogenizing the different components in stirrers, ball-mixers, kneading machines and the like.

The application of adhesive to sheet materials and in particular to paper sheets, is performed upstream from the station wherein said textile structure is formed and the adhesive coated sheets may be submitted to a conditioning treatment before attaining said station. A heating action directly performed before said station is advantageous since it promotes the creation of a surface plastic condition adapted to assist a prompt mating and interpenetration of the net-like textile structure into the adhesive layer or layers wherein said textile structure will be thoroughly embodied.

FIG. 7 diagrammatically shows a machine or equipment for a commercial, high-speed continuous production of laminated materials according to the invention.

The formation of net-like textile structure and the mating operation are carried-out between two rollers turning in opposite directions and fitted in a station 10 to which yarn sets 16 and 18 and paper sheets 22 and 23 are fed, said yarns being at least partially arranged in a sinusoidal pattern by suitable reciprocating means 20.

Said paper sheets are continuously unwound from reels or bobbins 26 and 28 respectively and are fed to reeling devices 30 and 32 respectively and then to adhesive applying devices 34 and 36 respectively, that are preferably in form of rollers partly dipped into baths 38 and 40 respectively of molten adhesive.

After a possible conditioning, said adhesive coated sheets are guided over heat radiating (e.g. infra-red rays radiating) means in order to bring the adhesive layers in a thermo-plasticity and adhesivity condition, directly before the mating thereof and formation of said intermediate layer wherein said net-like textile structure as formed in the same mating station is embodied.

When required, said mating step can be assisted and/or completed by applying a reduced pressure between the counter-revolving rollers, one of which may be made of a resilient material, and/or by winding the resulting laminated material about the same or further rollers, in order to bend said laminated material 50 in opposite directions and promote a settling and uniform adhesion of its sheet and other components.

Said settling may be completed e.g. by leading the laminated product about rollers 52, at least one of which can be cooled to hasten the hardening of bonding intermediate layer, such rollers being located before a bobbin 58 whereon the end product is wound.

Moreover the different guide rollers, in particular downstream of the adhesive applying devices, may be heated. Also said paper sheets may be pre-heated, downstream of said devices, to promote their adhesiveness.

Thermo-bonding compounds, suitable for an intermediate layer in a laminated material according to this invention, wherein two outer kraft paper sheets and a non-woven textile reinforcement consisting of multifilament polyamide yarns are bound together, are stated below by way of examples only. Such compounds are applied in a molten condition at a temperature of about 130° C., as reached with heated oil circulated through heating jackets of tanks 38 and 40 respectively. In the following examples all parts are in weight.

EXAMPLE 1

| | Parts |
|---|---|
| "Elvax 220" (ethylene-vinyl acetate copolymer, containing 28% of acetate; viscosity index=150) | 18 |
| Paraffin 60/62 | 59 |
| Polyethylene wax | 5 |
| "Microwax 80" wax | 10 |
| Colophony | 6 |
| Butyl rubber | 2 |
| Anti-oxidizing agent, when required. | |

At a temperature of 130° C. said adhesive compound is in the form of a liquid having a viscosity of about 2800 centipoises. Said adhesive was used for obtaining an intermediate layer weighing about 25–35 g./sq. m. between kraft paper sheets to which like amounts of adhesive were applied. A reinforced laminated material having a very good cold pliability and which components were firmly bonded with one another was thus obtained. Said material was produced in an equipment of the above described type at a speed of at least 45 m./min.

EXAMPLE 2

| | Parts |
|---|---|
| "Elvax 220" (a copolymer as stated in Example 1) | 5 |
| "Elvax 250" (a copolymer as stated in Example 1, and having a viscosity index=15) | 10 |
| "Elvax 260" (a copolymer as stated in Example 1, and having a viscosity index=3) | 15 |
| "Epolen" wax | 5 |
| "Microwax S 105" wax | 20 |
| Paraffin 63/65 | 30 |
| "Picolite" resin | 8 |
| Wax-butyl (30% mixture) | 7 |
| Anti-oxidizing agent, when required. | |

The above adhesive was treated under the same conditions as in Example 1 and a reinforced laminated product having gas, moisture and grease high proofness was obtained. The firm bond between components and the properties of product appeared practically unchanged even after a repeated bending thereof about a small diameter mandrel.

What is claimed is:

1. A method of producing elongated reinforced laminated sheet material formed of at least an upper strong kraft paper sheet and a juxtaposed lower strong kraft paper sheet, an intermediate layer of a binding substance securing said sheets together, and a web-like structure of non-woven filaments disposed in the intermediate layer, the method comprising the steps of forming a web-like structure by arranging a first set of filaments in parallel spaced relationship extending in a sinusoidal pattern with the axis of the sinusoidal pattern extending in the elongated direction of the sheet material, and arranging a second set of filaments in parallel spaced relationship extending in a sinusoidal pattern similar to the sinusoidal pattern of the first set with the axis of this sinusoidal pattern extending in the elongated direction of the sheet material and with the filaments of the second set in phased displacement relative to the filaments of the first set and with the filaments of the second set intersecting at least a plurality of the filaments of the first set and with the filaments of the first and second sets having a selected thickness, feeding the upper sheet and the lower sheet in the elongated direction of the sheet material, continuously coating the facing surfaces of the upper and lower sheets with a binding substance of a thermo-welding compound which includes at least one high molecular weight resin and at least one wax and applying a thickness of the binding substance so that the combined thickness of the binding substance coats is substantially equal to the selected thickness of the filaments in the first and second sets, placing the coated surfaces of the upper and lower sheets on the opposite sides of the first and second sets of filaments so that the filaments are embodied within the binding substance and the binding substance forms the intermediate layer joining the sheets together and spacing them apart by an amount substantially equal to the thickness of the filaments, and the binding substance forming the intermediate layer being susceptible of being torn and split apart by the filaments when they are caused to shift laterally between and parallel to the upper and lower sheets when stretched to cause a straightening of the sinusoidal pattern of the first and second sets of filaments.

2. A method, as set forth in claim 1, wherein the first and second sets of filaments have equal wave lengths and wave widths and the phase displacement between the first and second sets of filaments is about ¼ of the wave length of the sinusoidal pattern.

3. A method according to claim 2, wherein the web-like structure comprises at least a third set of straight arranged filaments, which are parallel both with one another and with the middlelines of the sinusoidal patterns of said two sets of filaments.

4. A method, according to claim 1, wherein at least one additional resin having a low molecular weight is present in the thermo-welding compound.

5. A method according to claim 1, wherein said compound comprises at least one elastomer.

6. A method according to claim 1, wherein said compound comprises as a component having an adhesive power a copolymer ethylene-vinyl acetate with a 27–29% vinyl acetate contents.

7. A method according to claim 4, wherein said compound comprises wax in amounts from 20 to 60% by weight.

8. An elongated reinforced laminated sheet material formed of at least two juxtaposed strong kraft paper sheets, an intermediate layer of a binding substance securing said sheets together, and a web-like structure of non-woven filaments disposed within said intermediate layer, wherein the improvement comprises that said web-like structure includes intersecting filaments disposed in spaced relationship and extending in a sinusoidal pattern with the axis of the sinusoidal pattern extending in the elongated direction of the sheet material, said web-like structure comprising at least two sets of filaments disposed in sinusoidal patterns with the filaments in each set disposed in phase displacement to the filaments in the other said set, the intermediate layer comprising a coat of binding substance of a thermo-welding compound including at least one high molecular weight resin and at least one wax for securing the facing surfaces of the sheets together and the intermediate layer having a thickness substantially equal to the thickness of the filaments, said intermediate layer defining a continuous planar layer-like space incorporating the filaments and spacing the facing surfaces of said paper sheets apart by at least the thickness of said filaments, and the binding substance in said intermediate layer has a resistance to being taken apart in the plane of the intermediate layer less than the tensile resistance of the filaments so that the filaments can shift laterally within the binding substance in the planer space between the juxtaposed sheets when subjected to a straightening stress.

9. A material, as set forth in claim 8, wherein the sinusoidal pattern of each set of filaments in said web-like structure is shifted at least one quarter of a wavelength with respect to the sinusoidal patterns of the other said set of filaments.

10. A material, as set forth in claim 9, wherein the web-like structure comprises a plurality of spaced parallel rectilinear filaments extending in the elongated direction of the sheet material and being in substantial parallel relationship with the axes of the sinusoidally patterned filaments.

11. A material according to claim 8, wherein said intermediate layer is formed with elastically deformable compound.

12. A material according to claim 8 wherein said intermediate layer is substantially gas and moisture proof.

13. A material according to claim 8 comprising said intermediate layer is a thermoplastics layer having thermoadhesive properties.

References Cited

UNITED STATES PATENTS

| | | | |
|---|---|---|---|
| 3,314,841 | 4/1967 | Romanin | 161—143 X |
| 2,897,841 | 8/1959 | Hui et al. | 161—142 X |
| 3,511,739 | 5/1970 | Hebberling | 161—142 X |
| 3,310,453 | 3/1967 | Lappala et al. | 161—143 X |
| 2,851,389 | 9/1958 | Lappala | 161—143 |
| 3,073,734 | 1/1963 | Bemmels | 161—143 |
| 3,095,338 | 6/1963 | Romanin | 161—142 |

ROBERT F. BURNETT, Primary Examiner

R. O. LINKER, Jr., Assistant Examiner

U.S. Cl. X.R.

156—179; 161—141, 143